US012609313B2

(12) United States Patent
Xie

(10) Patent No.: US 12,609,313 B2
(45) Date of Patent: Apr. 21, 2026

(54) POSITIVE ELECTRODE SLURRY COMPOSITION, POSITIVE ELECTRODE PLATE COMPRISING SAME, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventor: Haotian Xie, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 541 days.

(21) Appl. No.: 18/119,382

(22) Filed: Mar. 9, 2023

(65) Prior Publication Data

US 2023/0231130 A1 Jul. 20, 2023

Related U.S. Application Data

(63) Continuation of application No. PCT/CN2021/134474, filed on Nov. 30, 2021.

(51) Int. Cl.

*H01M 4/58* (2010.01)
*H01M 4/02* (2006.01)
(Continued)

(52) U.S. Cl.

CPC ......... *H01M 4/5825* (2013.01); *H01M 4/623* (2013.01); *H01M 4/624* (2013.01);
(Continued)

(58) Field of Classification Search

CPC .... H01M 4/5825; H01M 4/623; H01M 4/624; H01M 10/0525; H01M 50/204; H01M 4/136; H01M 4/62
See application file for complete search history.

(56) References Cited

U.S. PATENT DOCUMENTS

2007/0141468 A1 6/2007 Barker
2019/0296359 A1* 9/2019 Asano .................... H01M 4/62
(Continued)

FOREIGN PATENT DOCUMENTS

CN 105552344 A 5/2016
CN 107706351 A 2/2018
(Continued)

OTHER PUBLICATIONS

Extended European Search Report issued Oct. 17, 2024 in European Patent Application No. 21962754.4.
(Continued)

*Primary Examiner* — Stewart A Fraser
(74) *Attorney, Agent, or Firm* — XSENSUS LLP

(57) ABSTRACT

A positive electrode slurry composition of the present application may comprise a positive electrode active material, a lithium-supplementing agent and a binder, wherein the positive electrode active material may include a lithium-containing phosphate represented by formula (I), $LiFe_{1-b1-c1}Mn_{b1}M^1_{c1}PO_4$ formula (I)

in which $0 \le b1 \le 1$, $0 \le c1 \le 0.1$, and $M^1$ is selected from at least one of transition metal elements and non-transition metal elements in addition to Fe and Mn;

the lithium-supplementing agent may be selected from one or more of lithium metal oxides of $Li_{a1}M^2O_{0.5(2+a1)}$, $Li_2M^3O_3$, $Li_2M^4O_4$, $Li_3M^5O_4$, $Li_5M^6O_4$, and $Li_5M^7O_6$, and the binder may be represented by formula (II):

formula (II)

(Continued)

in which $R_1$ and $R_2$ are independently H or F, x, y, and z are all positive integers, and $0.52 \leq (4x+3y+2z)/(4x+4y+4z) \leq 0.7$.

19 Claims, 5 Drawing Sheets

(51) Int. Cl.
*H01M 4/62* (2006.01)
*H01M 10/0525* (2010.01)
*H01M 50/204* (2021.01)

(52) U.S. Cl.
CPC ..... *H01M 10/0525* (2013.01); *H01M 50/204* (2021.01); *H01M 2004/021* (2013.01); *H01M 2004/028* (2013.01)

(56) References Cited

U.S. PATENT DOCUMENTS

| | | | | |
|---|---|---|---|---|
| 2020/0243862 | A1* | 7/2020 | Hosoda | C08F 214/26 |
| 2022/0271294 | A1* | 8/2022 | Yamada | H01M 4/133 |

FOREIGN PATENT DOCUMENTS

| | | | |
|---|---|---|---|
| CN | 108232343 | A | 6/2018 |
| CN | 108682894 | A | 10/2018 |
| CN | 110729451 | A | 1/2020 |
| CN | 110854382 | A | 2/2020 |
| CN | 113140722 | A | 7/2021 |
| CN | 113394371 | A | 9/2021 |
| JP | 5534595 | B2 | 7/2014 |
| WO | 2004/006363 | A1 | 1/2004 |
| WO | 2021/002369 | A1 | 1/2021 |

OTHER PUBLICATIONS

International Search Report mailed on Aug. 26, 2022, received for PCT Application PCT/CN2021/134474, filed on Nov. 30, 2021, 6 pages including English Translation.

* cited by examiner

| Conventional PVDF, more particles on the surface | Special binder, flat on most of surface, a small amount of pores formed |
|---|---|
|  |  |

5

POSITIVE ELECTRODE SLURRY COMPOSITION, POSITIVE ELECTRODE PLATE COMPRISING SAME, SECONDARY BATTERY, BATTERY MODULE, BATTERY PACK AND POWER CONSUMING DEVICE

CROSS-REFERENCE TO RELATED APPLICATION

The present application is a continuation of International Application No. PCT/CN2021/134474, filed Nov. 30, 2021, which is incorporated herein by reference in its entirety.

TECHNICAL FIELD

The present application relates to the technical field of secondary batteries, and in particular to a positive electrode slurry composition, a positive electrode plate comprising same, a secondary battery, a battery module, a battery pack and a power consuming device.

BACKGROUND ART

Secondary batteries are widely used in consumer electronic products due to the advantages, such as a high energy density, a long cycling life and having no memory effect. In recent years, with the popularization of consumer electronic products and new energy vehicles, consumers have placed higher demands for the storage performance and safety performance of lithium ion batteries, and designing a lithium ion battery with excellent storage performance and good safety performance has become one of the main research and development directions.

SUMMARY OF THE DISCLOSURE

In view of the above issues, the present application has been made with an object thereof to provide a positive electrode slurry composition, such that a corresponding secondary battery with a positive electrode plate comprising the positive electrode slurry composition has a good storage performance and safety performance.

In order to achieve the above object, the present application provides a positive electrode slurry composition, a positive electrode plate comprising same, a secondary battery, a battery module, a battery pack and a power consuming device.

In a first aspect, the present application provides a positive electrode slurry composition, wherein the composition comprises a positive electrode active material, a lithium-supplementing agent and a binder, the positive electrode active material includes a lithium-containing phosphate represented by formula (I), $LiFe_{1-b1-c1}Mn_{b1}M^1_{c1}PO_4$ formula (I)

in which $0 \leq b1 \leq 1$, $0 \leq c1 \leq 0.1$, and $M^1$ is selected from at least one of transition metal elements and non-transition metal elements in addition to Fe and Mn;

the lithium-supplementing agent is selected from one or more of lithium metal oxides of $Li_{a1}M^2O_{0.5(2+a1)}$, $Li_2M^3O_3$, $Li_2M^4O_4$, $Li_3M^5O_4$, $Li_5M^6O_4$, and $Li_5M^7O_6$, in which $a1 \leq 1$, $M^2$ is selected from one or more of Ni, Co, Fe, Mn, Zn, Mg, Ca, Cu and Sn, $M^3$ is selected from one or more of Ni, Co, Fe, Mn, Sn and Cr, $M^4$ is selected from one or more of Ni, Co, Fe, Mn, Sn, Cr, V and Nb, $M^5$ is selected from one or more of Ni, Co, Fe, Mn, Sn, Cr, V, Mo and Nb, $M^6$ is selected from one or more of Ni, Co, Fe, Mn, Sn, Cr and Mo, $M^7$ is selected from one or more of Ni, Co and Mn, and the valence state of each element of $M^2$, $M^3$, $M^4$, $M^5$, $M^6$ and $M^7$ is lower than its own highest oxidation valence state, respectively; and the binder is represented by formula (II):

formula (II)

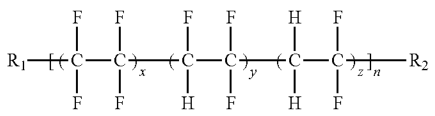

in which $R_1$ and $R_2$ are independently H or F, x, y, and z are all positive integers, and $0.52 \leq (4x+3y+2z)/(4x+4y+4z) \leq 0.7$.

In the present application, when the positive electrode slurry composition comprises all the above materials, the slurry composition is less prone to agglomeration and has higher stability, which is beneficial to improving the processability of the positive electrode plate. Therefore, the secondary battery with a positive electrode plate comprising the positive electrode slurry composition of the first aspect of the present application has good storage performance and safety performance.

In any embodiment, the lithium-supplementing agent comprises at least a lithium metal oxide represented by formula (III), $Li_{a2}Ni_{b2}Cu_{1-b2-c2}M^8_{c2}O_2$ formula (III)

in which $1<a2<3$, $0<b2<1$, $0 \leq c2<0.1$, and $M^8$ is selected from one or more of Zn, Sn, Mg, Fe and Mn, optionally $1<a2 \leq 2$, $0<b2 \leq 0.6$, and $0.01<c2<0.08$.

In any embodiment, the binder of formula (II) has a weight-average molecular weight of 500,000 to 1,200,000. A binder with a weight-average molecular weight within the above range facilitates to enable the good manufacturability of the positive electrode plate, while the corresponding secondary battery also has good electrochemical performance.

In any embodiment, the mass percentage of the binder in the composition is 0.2 wt %-10 wt %, optionally 0.5 wt %-4 wt %, further optionally 1 wt %-3.5 wt %, and more optionally 1.5 wt %-3 wt %.

When the content of the binder in the positive electrode slurry composition is within the above range, the gelling problem of the positive electrode slurry composition can be further alleviated, and a strong bonding effect is formed between the lithium-supplementing agent and the positive electrode active material, thereby improving the energy density and cycling life of the battery.

In any embodiment, the mass ratio of the binder of formula (II) to the lithium-supplementing agent in the composition is 0.2-2, optionally 0.4-1.5, and further optionally 0.7-1.0.

In the positive electrode slurry composition, a suitable mass ratio of the binder to the lithium-supplementing agent facilitates to further improving the cycling performance and safety performance of the battery.

In any embodiment, the mass percentage of the lithium-supplementing agent in the composition is 0.1 wt %-10 wt %, and optionally 2 wt %-7 wt %.

When the mass percentage of the lithium-supplementing agent in the positive electrode slurry composition is within the above range, for one thing, the loss of active lithium caused by the formation of a SEI film (solid electrolyte interphase film) in the negative electrode can be compensated, and for another, it can avoid the insufficient reversible lithium intercalation vacancies in the positive electrode due to a high content of the lithium-supplementing agent, which will affect the energy density of the battery cell.

In any embodiment, the lithium-supplementing agent has a volume average particle size D50 of 5 μm-15 μm, and the positive electrode active material has a volume average particle size D50 of 0.5 μm-5 μm.

In any embodiment, the lithium-supplementing agent has a pH of ≤13; optionally, pH≤12.5; and further optionally, 11≤pH≤12.5.

When the pH of the lithium-supplementing agent is within the above range, it is beneficial to further reducing the risk of gelling of the positive electrode slurry composition, further improving the processability and flatness of the positive electrode plate, and thereby further improving the first charge/discharge capacity and cycling life of the battery.

In any embodiment, the outer side of the lithium-supplementing agent may be coated with a single-layer or multi-layer coating layer, and the coating layer comprises one or more of the following materials: a metal fluoride, an oxide, a metal phosphate, a lithium salt, elemental carbon, and a polymer containing a five-membered heterocycle.

When the outer side of the lithium-supplementing agent is further coated with a coating layer comprising the above materials, the problem of deterioration of capacity per gram of charge/discharge caused by strong alkalinity of the lithium-supplementing agent can be avoided, thereby further improving the storage performance of the battery cell.

In any embodiment, the coating layer comprises one or more of the following materials: $AlF_3$, $V_2O_5$, $Al_2O_3$, $ZrO_2$, $TiO_2$, ZnO, $Co_3O_4$, $SiO_2$, $AlPO_4$, $FePO_4$, $Co_3(PO_4)_2$, $Ni_3(PO_4)_2$, $Li_3PO_4$, $Li_2MnO_3$, $LiAlO_2$, $Li_2TiO_3$, $Li_2ZrO_3$, graphene, carbon nanotubes, poly 3,4-ethylenedioxythiophene, and polypyrrole.

In any embodiment, the lithium-supplementing agent has a specific surface area of 0.5 $m^2/g$-20 $m^2/g$, optionally 1.0 $m^2/g$-19 $m^2/g$, further optionally 2 $m^2/g$-18 $m^2/g$, and more optionally 5 $m^2/g$-17 $m^2/g$.

When the specific surface area of the lithium-supplementing agent is within the above range, for one thing, the lithium-supplementing agent has a higher delithiation rate, which facilitates to timely compensating the lithium ions consumed in the cycling process, ensuring the quantity of active lithium, and avoiding the "capacity diving" of the battery capacity due to the significant reduction of the lithium ions; for another, it is also beneficial to reduce the pH value of the lithium-supplementing agent and further improve the stability of the positive electrode slurry composition.

In any embodiment, in addition to the binder represented by formula (II), the composition further comprises one or more of the following materials as a binder: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, an ethylene-propylene-propadiene terpolymer or a sulfonated ethylene-propylene-propadiene terpolymer, an ethylene-propylene-butadiene terpolymer or a sulfonated ethylene-propylene-butadiene terpolymer, an ethylene-propylene-pentadiene terpolymer or a sulfonated ethylene-propylene-pentadiene terpolymer, an ethylene-propylene-hexadiene terpolymer or a sulfonated ethylene-propylene-hexadiene terpolymer, a styrene butadiene rubber, and a fluorine-containing rubber; and/or the composition further comprises one or more of the following materials as a dispersant: sodium polyacrylate, sodium dodecylbenzenesulfonate, polypentene nitrile, polyacrylonitrile, and phenol polyoxyethylene ether.

In any embodiment, the dispersant is phenol polyoxyethylene ether.

In any embodiment, the positive electrode active material comprises lithium iron phosphate, and one or more of lithium ferrous phosphate, lithium manganese phosphate, lithium titanium phosphate, lithium cobalt phosphate, and lithium vanadium phosphate.

In a second aspect, the present application provides a positive electrode plate, comprising a positive electrode slurry composition of the first aspect of the present application.

In any embodiment, the mass percentage of the positive electrode slurry composition in the film layer of the positive electrode plate is not less than 80%, optionally not less than 90%, and further optionally not less than 95%.

In a third second aspect, the present application provides a secondary battery, comprising a positive electrode plate of the second aspect of the present application. The preparation of the secondary battery can be carried out by a method known in the prior art for preparing secondary batteries.

In a fourth aspect, the present application provides a battery module, comprising a secondary battery of the third aspect of the present application. The preparation of the battery module can be carried out by a method known in the prior art for preparing battery modules.

In a fifth aspect, the present application provides a battery pack, comprising at least one of a secondary battery of the third aspect of the present application or a battery module of the fourth aspect of the present application. The preparation of the battery pack can be carried out by a method known in the prior art for preparing battery packs.

In a sixth aspect, the present application provides a power consuming device, comprising at least one of a secondary battery of the third aspect of the present application, or a battery module of the fourth aspect of the present application, or a battery pack of the fifth aspect of the present application. The preparation of the power consuming device can be carried out by a method known in the prior art for preparing power consuming devices.

Advantageous Effects

In the present application, the positive electrode slurry composition comprises lithium-containing phosphate and a lithium-supplementing agent, and the lithium-supplementing agent can timely compensate the active lithium consumed during the cycling, which is beneficial to improving the storage performance of the lithium-containing phosphate batteries; at the same time, the addition of a binder with a fluorine substitution amount and a molecular weight within a certain range into the positive electrode slurry composition can avoid the physical gelling caused by the long molecular chain of the binder, thereby improving the chemical gel problem of the positive electrode slurry composition. Moreover, the positive electrode plate made of the positive electrode slurry composition can be effectively controlled, such that the bonding strength between the positive electrode active material and the lithium-supplementing agent in the positive electrode plate is ensured, and the processability of the positive electrode plate is improved, thereby improving the storage performance and safety performance of the battery. In addition, the binder can form pores on the surface of the positive electrode, and the pores on the surface facilitates the infiltration of the electrolyte, improving the liquid absorption rate, and reducing the battery resistance.

The battery module, the battery pack and the power consuming device of the present application comprise the secondary battery provided by the present application, and thus have at least the same advantages as the secondary battery.

LIST OF REFERENCE NUMERALS

Figure 1:
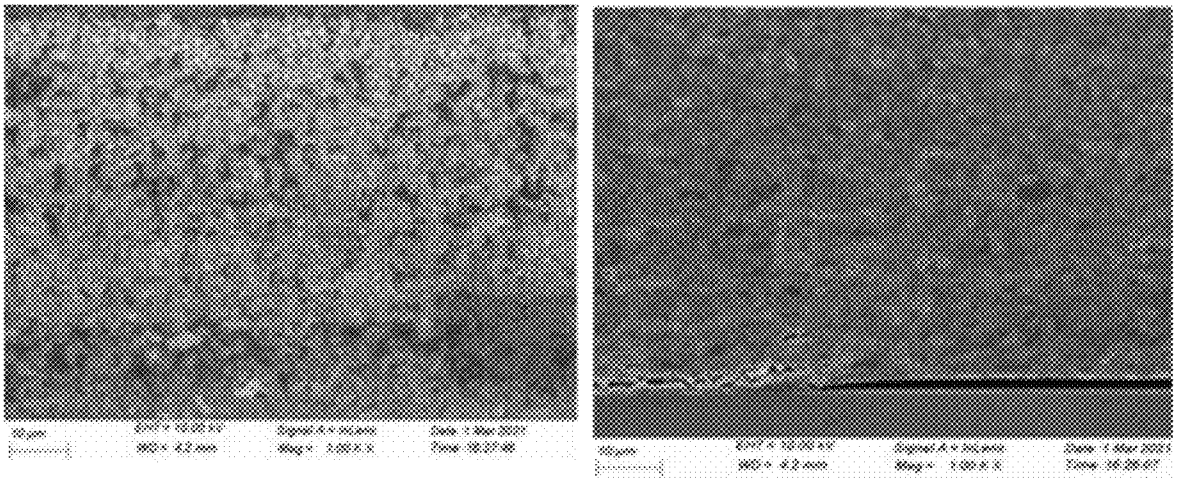
FIG. 1 shows scanning electron microscope images corresponding the surfaces of the positive electrode plates of comparative example 2 (left) and example 1 (right).
Figure 2:
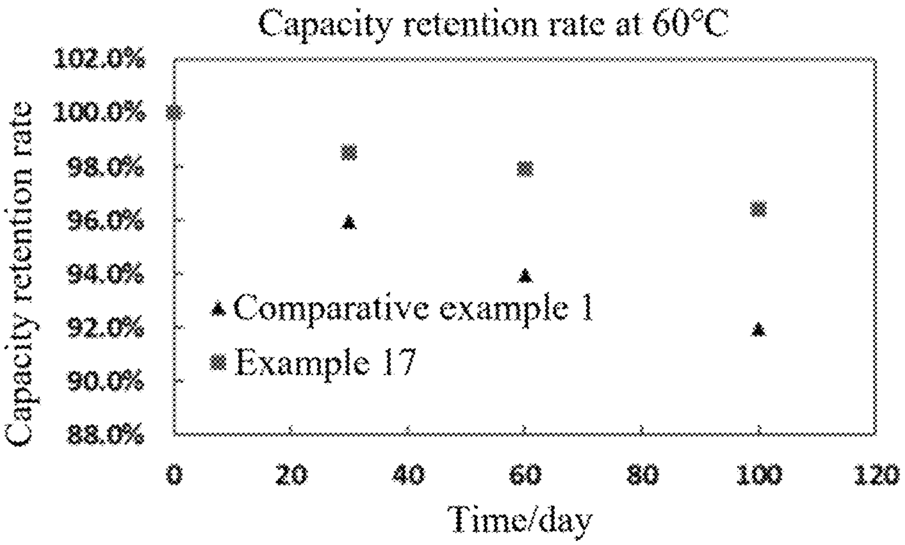
FIG. 2 is a graph of the storage capacity retention rate (%) at 60° C. vs time of batteries comprising the positive electrode plates of comparative example 1 and example 17 of the present application, respectively.

1—battery pack
2—upper case body
3—lower case body
4—battery module
5—lithium ion battery
51—housing
52—electrode assembly
53—top cover assembly.

DETAILED DESCRIPTION OF EMBODIMENTS

Hereinafter, a detailed description will be made with reference to the accompanying drawings, specifically disclosing a positive electrode plate and a preparation method therefor, a battery cell, a battery module, a battery pack and a power consuming device comprising same, but unnecessary detailed description will be omitted. For example, there are situations where detailed description of well known items and repeated description of actually identical structures are omitted and this is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

For the sake of brevity, the present application specifically discloses some numerical ranges, and various numerical ranges can be combined with each other to form corresponding embodiments. Any lower limit may be combined with any upper limit to form a range that is not explicitly described; and any lower limit may be combined with any other lower limit to form a range that is not explicitly specified, and any upper limit likewise may be combined with any other upper limit to form a range that is not explicitly specified. Furthermore, each individually disclosed point or single value itself may serve as a lower or upper limit in combination with any other point or single value or with other lower or upper limit to form an unspecified range.

Unless otherwise stated, the terms used in the present application have the meaning well-known to a person of ordinary skill in the art. In the present application, unless otherwise specified, "above" and "below" include the numbers themselves, for example "more than one of a and b" means at least one of a and b, such as a, b, or a and b. Likewise, "one or more" is meant to include at least one. In the description herein, unless otherwise specified, the term "or" is inclusive, that is, the phrase "A or B" means "A, B, or both A and B".

It should be noted herein that, the volume average particle size D50 refers to the particle size corresponding to the cumulative volume distribution percentage of the sample to be measured reaching 50%. In the present application, the volume average particle size D50 can be determined by a laser diffraction particle size analysis method. For example, the determination may be carried out with reference to the standard GB/T 19077-2016 using a laser particle size analyzer (e.g., Malvern Master Size 3000).

It should be noted that, in the compound of formula (II) of the present application, $m=(4x+3y+2z)/(4x+4y+4z)$ represents the substitution amount of the F element in the binder.

The inventors have found in the practical work that when adding a lithium-supplementing agent into the positive electrode plate of a lithium secondary battery, if the lithium-supplementing agent is directly added into the positive electrode slurry, it may cause the gelling of the positive electrode slurry, thereby affecting the coating of the positive electrode slurry, and in turn affecting the storage performance and safety performance of the secondary battery. In order to solve the above problems, the inventors have unexpectedly discovered by a large number of experiments that by comprising a specific type of binder in the positive electrode slurry, the gelling problem of the positive electrode slurry can be effectively solved, thereby improving the stability of the positive electrode slurry, and further improving the storage performance and safety performance of the secondary battery.

[Positive Electrode Slurry Composition]

In a first aspect, the present application provides a positive electrode slurry composition, wherein the composition comprises a positive electrode active material, a lithium-supplementing agent and a binder, the positive electrode active material includes a lithium-containing phosphate represented by formula (I), $$LiFe_{1-b1-c1}Mn_{b1}M^1_{c1}PO_4 \quad \text{formula (I)}$$

in which $0 \le b1 \le 1$, $0 \le c1 \le 0.1$, and $M^1$ is selected from at least one of transition metal elements and non-transition metal elements in addition to Fe and Mn;

the lithium-supplementing agent is selected from one or more of lithium metal oxides of $Li_{a1}M^2O_{0.5(2+a1)}$, $Li_2M^3O_3$, $Li_2M^4O_4$, $Li_3M^5O_4$, $Li_5M^6O_4$, and $Li_5M^7O_6$, in which $a1 \ge 1$, $M^2$ is selected from one or more of Ni, Co, Fe, Mn, Zn, Mg, Ca, Cu and Sn, $M^3$ is selected from one or more of Ni, Co, Fe, Mn, Sn and Cr, $M^4$ is selected from one or more of Ni, Co, Fe, Mn, Sn, Cr, V and Nb, $M^5$ is selected from one or more of Ni, Co, Fe, Mn, Sn, Cr, V, Mo and Nb, $M^6$ is selected from one or more of Ni, Co, Fe, Mn, Sn, Cr and Mo, $M^7$ is selected from one or more of Ni, Co and Mn, and the valence state of each element of $M^2$, $M^3$, $M^4$, $M^5$, $M^6$ and $M^7$ is lower than its own highest oxidation valence state, respectively; and the binder is represented by formula (II):

formula (II)

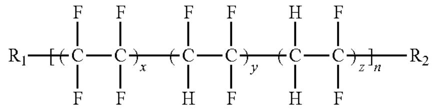

in which $R_1$ and $R_2$ are independently H or F, x, y, and z are all positive integers, and $0.52 \le (4x+3y+2z)/(4x+4y+4z) \le 0.7$.

In the binder of formula (II), $m=(4x+3y+2z)/(4x+4y+4z)$ represents the substitution amount of the F element in the binder. Optionally, when m is too small, there is a large amount of H in the positive electrode slurry, which may lead to the release of a large amount of HF from the binder. For one thing, this may cause deactivation of the binder and demoulding of the positive electrode plate; for another, this may lead to the chemical gelling of the positive electrode slurry, thus seriously affecting the productivity and reliability of the secondary battery. When m is too large, there is a large amount of F in the positive electrode slurry, indicating that the content of tetrafluoroethylene in the binder is large, which may not be beneficial to fully enable the binding effect of the binder, thereby improving the performance of the secondary battery.

In the present application, the positive electrode slurry composition comprises lithium-containing phosphate and a lithium-supplementing agent, and the lithium-supplementing agent can timely compensate the active lithium consumed during the cycling, which is beneficial to improving the storage performance of the lithium-containing phosphate batteries; at the same time, adding a binder with a fluorine substitution amount and molecular weight within a certain range into the positive electrode slurry composition can avoid the physical gelling caused by the long molecular chain the binder, and further improve the chemical gelling problem of the positive electrode slurry composition, moreover, the positive electrode plate made of the positive electrode slurry composition can be effectively controlled, such that the bonding strength between the positive electrode active material and the lithium-supplementing agent in the positive electrode plate is ensured, and the processability of the positive electrode plate is improved, thereby improving the storage performance and safety performance of the battery. In addition, the binder of formula (II) can form pores on the surface of the positive electrode, and the pores on the surface facilitates the infiltration of the electrolyte, improving the liquid absorption rate, and reducing the battery resistance.

In some embodiments, the lithium-supplementing agent comprises a lithium metal oxide represented by formula (III), $$Li_{a2}Ni_{b2}Cu_{1-b2-c2}M^8_{c2}O_2 \quad \text{formula (III)}$$

in which $1<a2<3$, $0<b2<1$, $0 \le c2<0.1$, and $M^8$ is selected from one or more of Zn, Sn, Mg, Fe and Mn, optionally $1<a2 \le 2$, $0<b2 \le 0.6$, and $0.01<c2<0.08$.

When the lithium metal oxide represented by formula (III) is selected as the lithium-supplementing agent in the positive electrode slurry composition, the positive electrode plate made from the above positive electrode slurry composition has a higher specific charge capacity and specific discharge capacity.

The inventors found that: When the content of Cu in the lithium metal oxide represented by formula (III) is small, there are relatively more NiO in the lithium-supplementing agent, which is not beneficial to the capacity. Therefore, in order to achieve a good effect of lithium supplementiation, optionally, in the lithium metal oxide represented by formula (III), $1<a2 \le 2$, $0<b2 \le 0.6$, and $0.01<c2<0.08$.

In some embodiments, optionally, the binder of formula (II) has a weight-average molecular weight of 500,000 to 1,200,000.

In the composition of the first aspect of the present application, when the binder has a weight-average molecular weight of 500,000 to 1,200,000, the positive electrode plate can achieve a good manufacturability, and the corresponding secondary battery has a better electrochemical performance at the same time. When the weight-average molecular weight of the binder is too large, the binder has a longer molecular chain, which is easy to cause particle agglomeration and physical gel. When the weight-average molecular weight of the binder is too small, the binder has a shorter molecular chain, which may cause insufficient bonding and thus lead to the demoulding of the electrode plate.

In some embodiments, optionally, the mass percentage of the binder in the composition is 0.2 wt %-10 wt %, optionally 0.5 wt %-4 wt %, further optionally 1 wt %-3.5 wt %, and more optionally 1.5 wt %-3 wt %.

By comprising an appropriate amount of the binder in the positive electrode active material layer, the gel problem of the slurry can be effectively alleviated, and a strong bonding effect is formed between the lithium-supplementing agent and the positive electrode active material, such that the energy density and cycling life of the battery can be improved. When the mass percentage of the binder in the positive electrode plate is too small, it may lead to insufficient bonding between the binder, the active ingredient and the lithium-supplementing agent, resulting in the shedding of the active materials and the lithium-supplementing agent and causing safety problems. When the mass percentage of the binder in the positive electrode plate is too large, it may lead to poor conductivity of the electrode plate, deteriorate the battery impedance, and affect the dynamics performance of the secondary battery.

In some embodiments, optionally, the mass ratio of the binder of formula (II) to the lithium-supplementing agent in the composition is 0.2-2, optionally 0.4-1.5, and further optionally 0.7-1.0.

Although the mechanism is not yet clear, the inventors unexpectedly found that when the mass ratio of the lithium-supplementing agent to the binder is within the above range, it is beneficial to give full play to the binding effect of the binder and to inhibit the physical gel and chemical gel of the positive electrode slurry composition and improve the safety performance and storage performance of secondary battery.

In some embodiments, optionally, the mass percentage of the lithium-supplementing agent in the composition is 0.1 wt %-10 wt %, and optionally 2 wt %-7 wt %.

When the content of the lithium-supplementing agent is lower than the above range, the loss of the active lithium of the positive electrode may not be compensated. When the content of the lithium-supplementing agent is higher than the above range, it may cause insufficient reversible lithium intercalation vacancies in the positive electrode and affect the energy density of the battery cell.

In some embodiments, optionally, the mass percentage of the positive electrode active material in the composition of the present composition is 80 wt %-99.5 wt %, and optionally 88 wt %-96 wt %.

In some embodiments, optionally, the lithium-supplementing agent has a volume average particle size D50 of 5 μm-15 μm, and the positive electrode active material has a volume average particle size D50 of 0.5 μm-5 μm.

In the present application, when the volume average particle size D50 of the lithium-supplementing agent is within the above range, the lithium-supplementing agent has a faster delithiation rate, which is beneficial to compensate the capacity loss caused by the low first effect, thereby improving the cycling performance of the battery.

In some embodiments, optionally, the lithium-supplementing agent has a pH of $\leq 13$; optionally, $pH \leq 12.5$; and further optionally, $11 \leq pH \leq 12.5$.

When the pH of the lithium-supplementing agent is within the above range, it is beneficial to further reduce the risk of gel of the lithium-supplementing layer slurry, further improve the lithium-supplementing effect, and thereby improving the first charge-discharge capacity and cycling life of the battery. Since the lithium-supplementing agent used in the present application has a high sensitivity to water, when the pH of the lithium-supplementing agent is too high, the alkali of the lithium-supplementing agent is very strong, which may affect the discharge gram capacity after absorbing water, and is not beneficial to improving the performance of the battery.

It should be noted that the method for measuring the pH of the lithium-supplementing agent can be a method commonly used by those skilled in the art, such as a titration method.

In some embodiments, optionally, the outer side of the lithium-supplementing agent is coated with a single-layer or multi-layer coating layer, and the coating layer comprises one or more of the following materials: a metal fluoride, an oxide, a metal phosphate, a lithium salt, elemental carbon, and a polymer containing a five-membered heterocycle.

By coating the above coating layer on the outer side of the lithium-supplementing agent, on the one hand, it is beneficial to improving the gel problem of the composition of the present application, and on the other hand, it can effectively improve the technical problem that affect the discharge gram capacity due to the strong alkalinity of the lithium-supplementing agent, thereby improving the storage performance of the battery.

In some embodiments, optionally, the coating layer comprises one or more of the following materials: $AlF_3$, $V_2O_5$, $Al_2O_3$, $ZrO_2$, $TiO_2$, ZnO, $Co_3O_4$, $SiO_2$, $AlPO_4$, $FePO_4$, $Co_3(PO_4)_2$, $Ni_3(PO_4)_2$, $Li_3PO_4$, $Li_2MnO_3$, $LiAlO_2$, $Li_2TiO_3$, $Li_2ZrO_3$, graphene, carbon nanotubes, poly 3,4-ethylenedioxythiophene, and polypyrrole.

In some embodiments, optionally, the lithium-supplementing agent has a specific surface area of 0.5 $m^2/g$-20 $m^2/g$, optionally 1.0 $m^2/g$-19 $m^2/g$, further optionally 2 $m^2/g$-18 $m^2/g$, and more optionally 5 $m^2/g$-17 $m^2/g$. The measurement of the specific surface area can be carried out by a method commonly used in the art, for example, which can be carried out according to the standard GB/T19587-2004.

By adjusting the specific surface area of the lithium-supplementing agent within the above range, the lithium ions consumed by the negative electrode can be effectively and timely compensated, the amount of active lithium can be guaranteed, thereby improving the capacity performance of the secondary battery.

In some embodiments, optionally, in addition to the binder represented by formula (II), the composition further comprises one or more of the following materials as a binder: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, an ethylene-propylene-propadiene terpolymer or a sulfonated ethylene-propylene-propadiene terpolymer, an ethylene-propylene-butadiene terpolymer or a sulfonated ethylene-propylene-butadiene terpolymer, an ethylene-propylene-pentadiene terpolymer or a sulfonated ethylene-propylene-pentadiene terpolymer, an ethylene-propylene-hexadiene terpolymer or a sulfonated ethylene-propylene-hexadiene terpolymer, a styrene butadiene rubber, and a fluorine-containing rubber; and/or the composition further comprises one or more of the following materials as a dispersant: sodium polyacrylate, sodium dodecylbenzenesulfonate, polypentene nitrile, polyacrylonitrile, and phenol polyoxyethylene ether.

The addition of a dispersant to the positive electrode slurry composition of the present application facilitates to increase the porosity and reduce the migration resistance of lithium ions, thereby reducing the direct current resistance and improving the dynamics performance.

In some embodiments, optionally, the dispersant is phenol polyoxyethylene ether.

In some embodiments, optionally, the positive electrode active material represented by formula (I) comprises lithium iron phosphate, and one or more of lithium ferrous phosphate, lithium manganese phosphate, lithium titanium phosphate, lithium cobalt phosphate, and lithium vanadium phosphate.

[Positive Electrode Plate]

In a second aspect, the present application provides a positive electrode plate, comprising a positive electrode slurry composition of the first aspect of the present application.

The positive electrode plate comprises a positive electrode current collector and a positive electrode film layer provided on at least one surface of the positive electrode current collector, the positive electrode film layer comprising the positive electrode slurry composition of the first aspect of the present application.

As an example, the positive electrode current collector has two surfaces opposite in its own thickness direction, and the positive electrode film layer is provided on either or both of the two opposite surfaces of the positive electrode current collector.

In some embodiments, the positive electrode current collector may be a metal foil or a composite current collector. For example, as a metal foil, an aluminum foil can be used. The composite current collector may comprise a polymer material base layer and a metal layer formed on at least one surface of the polymer material base layer. The composite current collector can be formed by forming a metal material (aluminum, an aluminum alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, optionally, the positive electrode film layer may also comprise a conductive agent. As an example, the conductive agent may include at least one of superconducting carbon, acetylene black, carbon black, Ketjen black, carbon dots, carbon nanotubes, graphene, and carbon nanofibers.

In some embodiments, optionally, the mass percentage of the positive electrode slurry composition in the film layer of the positive electrode plate is not less than 80%, optionally not less than 90%, and further optionally not less than 95%.

In some embodiments, the positive electrode plate can be prepared as follows: the above components for preparing the positive electrode plate, such as a positive electrode active material, a lithium-supplementing agent, a binder, a conductive agent and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material base layer and a metal layer formed on at least one surface of the polymer material base layer. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material can be selected from at least one of elemental silicon, silicon oxides, silicon carbon composites, silicon nitrogen composites, and silicon alloys. The tin-based material can be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer also optionally comprise a binder. The binder can be selected from at least one of a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer also optionally comprise a conductive agent. The conductive agent can be selected from at least one of superconductive carbon, acetylene black, carbon black, ketjenblack, carbon dots, carbon nanotubes, graphene, and carbon nanofibers.

In some embodiments, the negative electrode film layer also optionally comprise other auxiliary agents, such as thickener (e.g. sodium carboxymethyl cellulose (CMC-Na)) and the like.

In some embodiments, the negative electrode plate can be prepared as follows: the above components for preparing the negative electrode plate, such as negative electrode active material, conductive agent, binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte Solution]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, an electrolyte solution is used as the electrolyte. The electrolyte solution comprises an electrolyte salt and a solvent.

In some embodiments, the electrolyte salt can be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent can be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution also optionally comprise an additive. For example, the additive may include a negative electrode film-forming additive, a positive electrode film-forming additive, and also an additive that can improve certain performances of the battery, such as an additive that improve the overcharge performance of the battery, or an additive that improve the high-temperature performance or low-temperature performance of the battery.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator can be selected from at least one of glass fibers, a non-woven, polyethylene, polypropylene and polyvinylidene fluoride. The separator may be a single-layer film and also a multi-layer composite film, and is not particularly limited. When the separator is a multi-layer composite film, the materials of the layers may be same or different, which is not particularly limited.

In some embodiments, the positive electrode plate, the negative electrode plate and the separator can be manufactured into an electrode assembly by means of a winding process or a lamination process.

[Secondary Battery]

In a third aspect, the present application provides a secondary battery, comprising a negative electrode active material of the first aspect of the present application or a positive electrode plate of the second aspect of the present application.

Typically, the secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and allows ions to pass through.

In some embodiments, the lithium ion secondary battery may comprise an outer package. The outer package can be used to encapsulate the above electrode assemblies and electrolyte.

In some embodiments, the outer package of the lithium ion secondary battery may be a hard shell, for example, a hard plastic shell, an aluminum shell, a steel shell, etc. The outer package of the lithium ion secondary battery may also be a soft bag, for example, a pouch-type soft bag. The material of the soft bag may be plastics, and the examples of plastics may include polypropylene (PP), polybutylene terephthalate (PBT), and polybutylene succinate (PBS), etc.

In addition, the secondary battery, battery module, battery pack and power consuming device of the present application are described below with reference to the accompanying drawings as appropriate.

Figure 5:
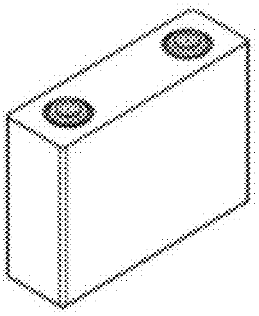
FIG. 5 is a schematic diagram of a lithium ion battery according to an embodiment of the present application.

The shape of the secondary battery is not particularly limited in the present application, and may be cylindrical, square or of any other shape. For example, FIG. 5 shows a secondary battery 5 with a square structure as an example.

Figure 6:
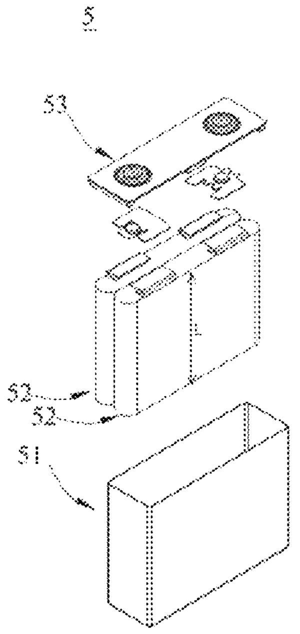
FIG. 6 is an exploded view of a lithium ion battery according to an embodiment of the present application as shown in FIG. 5.

In some embodiments, referring to FIG. 6, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be manufactured into an electrode assembly 52 by means of a winding process or a stacking process. The electrode assembly 52 is encapsulated in the accommodating cavity. An electrolyte is infiltrated into the electrode assembly 52. The number of the electrode assemblies 52 contained in the secondary battery 5 may be one or more, and can be selected by those skilled in the art according to actual requirements.

In some embodiments, a lithium ion secondary battery can be assembled into a battery module, and the number of the lithium ion batteries contained in the battery module may be one or more, and the specific number can be selected by those skilled in the art according to the application and capacity of the battery module.

Figure 7:
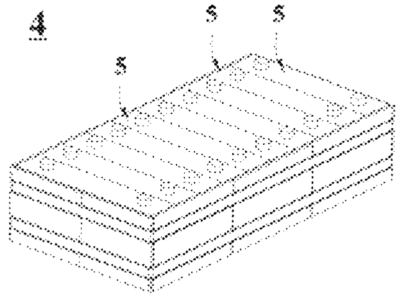
FIG. 7 is a schematic diagram of a battery module according to an embodiment of the present application.

FIG. 7 shows a battery module 4 as an example. Referring to FIG. 7, in the battery module 4, a plurality of lithium ion batteries 5 can be provided in sequence in the length direction of the battery module 4. Apparently, the secondary batteries can also be provided in any other manner. Further, the plurality of lithium ion batteries 5 may be fixed by fasteners.

Optionally, the battery module 4 may also comprise a housing with an accommodating space, and the plurality of lithium ion batteries 5 are accommodated in the accommodating space.

In some embodiments, the above battery module may also be assembled into a battery pack, the number of battery modules contained in the battery pack may be one or more, and the specific number can be selected by those skilled in the art according to the application and capacity of the battery pack.

Figure 8:
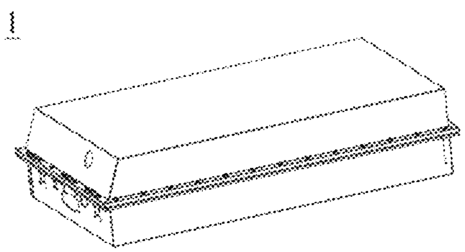
FIG. 8 is a schematic diagram of a battery pack according to an embodiment of the present application.
Figure 9:
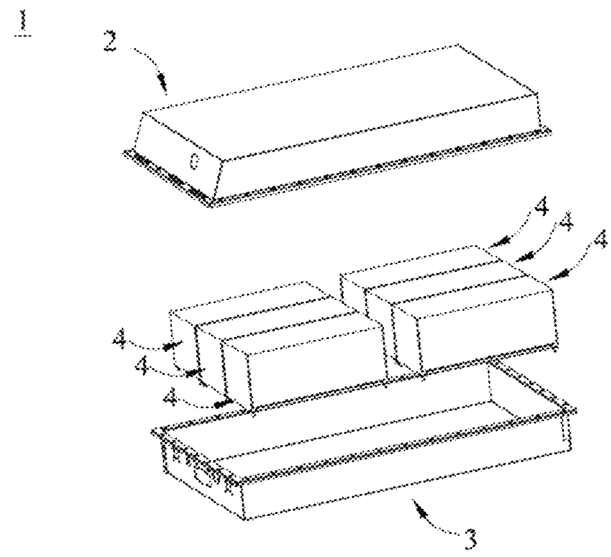
FIG. 9 is an exploded view of a battery pack according to the embodiment of the present application as shown in FIG. 8.

FIG. 8 and FIG. 9 show a battery pack 1 as an example. Referring to FIGS. 8 and 9, the battery pack 1 may comprise a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. The plurality of battery modules 4 may be provided in the battery case in any manner.

In addition, the present application further provides a power consuming device, comprising at least one of a secondary battery, a battery module, or a battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 10:
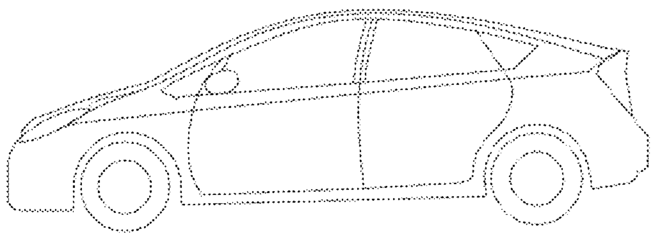
FIG. 10 is a schematic diagram of a power consuming device according to an embodiment of the present application.

FIG. 10 shows a power consuming device as an example. The power consuming device may be a pure electric vehicle, a hybrid electric vehicle, or a plug-in hybrid electric vehicle, etc. In order to meet the requirements of the power consuming device for a high power and a high energy density of a secondary battery, a battery pack or a battery module may be used.

As another example, the device may be a mobile phone, a tablet, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. Reagents or instruments for which manufacturers are not specified, are all commonly used conventional products in the art that are commercially available. The content of each component in the examples of the present application is based on the dry weight without crystal water, unless otherwise stated.

The sources of the raw materials involved in the examples of the present application are as shown in the following table:

ized water. When the conductivity of the washing water is determined to be ≤5 μs/cm, the resulting emulsion is dried in a vacuum oven at 100° C. for 24 h, and the resulting PVDF resin is the binder A.

The test method for conductivity is as follows, with reference to the standard HG/T 4067-2015. A conductivity meter DDSJ-318 is used, the electrode is firstly rinsed with the sample water to be tested 2-3 times, and the temperature corrected at the same time, the sampling is repeated 2-3 times for test, and when the test result and the relative error are both within 3%, the final result is obtained.

Preparation of Binder B:

20 kg of deionized water is added to a 50 L high-pressure reaction kettle, and vacuumizing is performed. Stirring is

| Name | Manufacturer, brand | CAS number, molecular weight and other information |
|---|---|---|
| Conductive agent of carbon black | Shanghai McLean Biotechnology Co., Ltd. | CAS: 1333-86-4 |
| Polyvinylidene Fluoride (PVDF) | Shanghai McLean Biotechnology Co., Ltd. | CAS: 24937-79-9, with a weight-average molecular weight of 900,000 |
| N-Methylpyrrolidone (NMP) | Shanghai McLean Biotechnology Co., Ltd. | CAS: 872-50-4 |
| Styrene butadiene rubber (SBR) | Shanghai McLean Biotechnology Co., Ltd. | CAS: 9003-55-8 |
| Ethylene carbonate (EC) | Shanghai McLean Biotechnology Co., Ltd. | CAS: 96-49-1 |
| Dimethyl Carbonate (DMC) | Shanghai McLean Biotechnology Co., Ltd. | CAS: 616-38-6 |
| Sodium carboxymethyl cellulose | Sigma-Aldrich | CAS: 9004-32-4 |
| Lithium iron phosphate | Shanghai McLean Biotechnology Co., Ltd. | CAS: 15365-14-7 |
| Sodium 3-allyloxy-2-hydroxy-1-propanesulfonate | Shanghai McLean Biotechnology Co., Ltd. | CAS: 52556-42-0 |
| 1,1-Difluoroethylene | Shanghai McLean Biotechnology Co., Ltd. | CAS: 75-38-7 |
| 2,2'-Azobisisobutyronitrile | Shanghai McLean Biotechnology Co., Ltd. | CAS: 75804-30-7 |
| Acrylic acid | Shanghai McLean Biotechnology Co., Ltd. | CAS: 79-10-7 |
| Tetrafluoroethylene | Shanghai McLean Biotechnology Co., Ltd. | CAS: 116-14-3 |
| Dodecylbenzyl alcohol | Shanghai McLean Biotechnology Co., Ltd. | 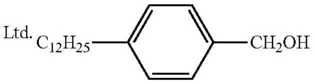 Structural formula |

The preparation methods for the binder A, binder B, binder C (C1-C6) and dispersant of phenol polyoxyethylene ether used in the following examples are as follows:

Preparation of Binder A:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 10 kg of a VDF (i.e., 1,1-difluoroethylene, denoted as $C_2H_2F_2$) monomer is added to the reaction kettle using a diaphragm compressor, pressurized to a set reaction pressure (6 MPa), and stirred for 60 min. 50 g of 2, 2'-azodiisobutyronitrile (AIBN, denoted as $C_8H_{12}N_4$) is then added, and the feed valve of the reaction kettle is closed. The reaction kettle is heated to 70° C. for a reaction for 5 h. 0.9 kg of ethyl acetate (20% every 1 h) is gradually added over 5 h, then 100 g of acetone (with a purity of 99.5%) is added to stop the reaction, and the unreacted monomer is recovered. The emulsion obtained at a temperature of 70° C. or more is demulsified by mechanical stirring and washed with deionthen turned on, and 80 g of sodium 3-allyloxy-2-hydroxy-1-propanesulfonate (AHPS, denoted as $C_6H_{11}NaO_5S$) is added. 9.5 kg of a VDF (i.e., 1,1-difluoroethylene, denoted as $C_2H_2F_2$) monomer and 0.5 kg of an acrylic acid (denoted as $C_3H_4O_2$) monomer are added to the reaction kettle using a diaphragm compressor, pressurized to a set reaction pressure (8 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C. for a reaction for 16 h. 0.5 kg of ethyl acetate (20% every 3 h) is gradually added over 16 h, then 100 g of acetone (with a purity of 99.5%) is added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder B.

Preparation of Binder C1:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 7.5 kg of a VDF (i.e., 1,1-difluoroethylene, denoted as $C_2H_2F_2$) monomer and 2.5 kg of a TFE (i.e., tetrafluoroethylene, denoted as $C_2F_4$) monomer are added to the reaction kettle using a diaphragm compressor, pressurized to a set reaction pressure (6 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 5 h, and 1.05 kg of ethyl acetate (20% every 1 h) is gradually added over 5 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C1.

Preparation of Binder C2:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 7.5 kg of a VDF (i.e., 1,1-difluoroethylene, denoted as $C_2H_2F_2$) monomer and 2.5 kg of a TFE (i.e., tetrafluoroethylene, denoted as $C_2F_4$) monomer are added to the reaction kettle using a diaphragm compressor, pressurized to a set reaction pressure (4.2 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 3 h, and 1.2 kg of ethyl acetate (33% every 1 h) is gradually added over 3 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C2.

Preparation of Binder C3:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 7.5 kg of a VDF (i.e., 1,1-difluoroethylene, denoted as $C_2H_2F_2$) monomer and 2.5 kg of a TFE (i.e., tetrafluoroethylene, denoted as $C_2F_4$) monomer are added to the reaction kettle using a diaphragm compressor, pressurized to a set reaction pressure (8 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 12 h, and 0.7 kg of ethyl acetate (20% every 2 h) is gradually added over 12 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C3.

Preparation of Binder C4:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 7.5 kg of a VDF (i.e., 1,1-difluoroethylene, denoted as $C_2H_2F_2$) monomer and 2.5 kg of a TFE (i.e., tetrafluoroethylene, denoted as $C_2F_4$) monomer are added to the reaction kettle using a diaphragm compressor, pressurized to a set reaction pressure (8 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 20 h, and 0.5 kg of ethyl acetate (20% every 4 h) is gradually added over 20 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C4.

Preparation of Binder C5:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 8.6 kg of a VDF (i.e., 1,1-difluoroethylene, denoted as $C_2H_2F_2$) monomer and 1.4 kg of a TFE (i.e., tetrafluoroethylene, denoted as $C_2F_4$) monomer are added to the reaction kettle using a diaphragm compressor, pressurized to a set reaction pressure (6 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 5 h, and 1.05 kg of ethyl acetate (20% every 1 h) is gradually added over 5 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C5.

Preparation of Binder C6:

20 kg of deionized water is added to a 50 L high-pressure reaction kettle, and vacuumizing is performed. Stirring is then turned on, and 80 g of sodium 3-allyloxy-2-hydroxy-1-propanesulfonate (AHPS, denoted as $C_6H_{11}NaO_5S$) is added. 6.7 kg of a VDF (i.e., 1,1-difluoroethylene, denoted as $C_2H_2F_2$) monomer and 3.3 kg of a TFE (i.e., tetrafluoroethylene, denoted as $C_2F_4$) monomer are added to the reaction kettle using a diaphragm compressor, pressurized to a set reaction pressure (6 MPa), and stirred for 60 min. 50 g of 2,2'-azodiisobutyronitrile (AIBN, denoted as $C_8H_{12}N_4$) is then added, and the feed valve of the reaction kettle is closed. The reaction kettle is heated to 70° C., for a reaction for 5 h, and 1.05 kg of ethyl acetate (20% every 1 h) is gradually added over 5 h. 100 g of acetone (with a purity of 99.5%) is then added to stop the reaction, and the unreacted monomer is recovered. The emulsion obtained at a temperature of 70° C. or more is demulsified by mechanical stirring and washed with deionized water. When the conductivity of the washing water is determined to be ≤5 μs/cm, the resulting emulsion is dried in a vacuum oven at 100° C. for 24 h, and the resulting PVDF resin is the binder C6.

Preparation of Dispersant of Phenol Polyoxyethylene Ether:

10 kg of dodecylbenzyl alcohol (denoted as $C_{19}H_{32}O$), 1 kg of sodium methoxide (denoted as $CH_3ONa$) and 10 kg of ethylene oxide (denoted as $C_2H_4O$) which have been vacuum-dried are added to a 50 L high-pressure reaction kettle, while nitrogen is introduced to replace the air in the reaction kettle. The reaction kettle is heated to 130° C. for a reaction for 30 h while turning on the magnetic stirring. At the end of the reaction, the reaction kettle is cooled to room temperature (left open for 24 h). Then the reaction kettle is weighed. The mass of the product in the reaction kettle is substantially unchanged, and the mass of the materials is conserved before and after the reaction, which indicates that ethylene oxide is fully reacted. The product is then washed with deionized water and extracted with petroleum ether to separate the upper liquid.

Comparative Example 1

Preparation of negative electrode plate: Graphite, a conductive agent of acetylene black, a binder of a styrene butadiene rubber (SBR) and a thickener of sodium carboxymethyl cellulose (CMC) are dissolved into a solvent of deionized water at a mass ratio of 96.5:0.7:1.8:1, followed by fully stirring and uniformly mixing to obtain a negative electrode slurry. The negative electrode slurry is uniformly coated onto a negative electrode current collector of copper foil, followed by drying, cold pressing, and slitting to obtain the negative electrode plate. The resulting negative electrode active material layer has an areal density of 9.8 mg/cm$^2$ and a compacted density of 1.65 g/cm$^3$;

Preparation of positive electrode plate: An active material of $LiFePO_4$ (LFP), a conductive agent of acetylene black, and a binder A are mixed at a mass ratio of 97:1:2, and then dissolved into a solvent of N-methylpyrrolidone (i.e., NMP), followed by full stirring and uniform mixing to obtain a positive electrode slurry. The active material of $LiFePO_4$ particles have a volume-average particle size D50 of 1.2 μm. The positive electrode slurry is uniformly coated onto an aluminum foil, followed by drying, cold pressing, and slitting to obtain the positive electrode plate. The resulting positive electrode active material layer has an areal density of 19.5 mg/cm$^2$ and a compacted density of 2.4 g/cm$^3$.

Preparation of electrolyte solution: Organic solvents of ethylene carbonate (EC)/methyl ethyl carbonate (EMC) are uniformly mixed at a weight ratio of 50/50, and then $LiPF_6$ is added and dissolved in the organic solvent, the mixture is uniformly stirred to obtain the electrolyte solution, wherein the concentration of $LiPF_6$ is 1.1 mol/L.

Preparation of full battery: The above obtained positive electrode plate, separator and negative electrode plate are stacked in sequence, such that the separator is located between the positive electrode plate and the negative electrode plate to function for isolation, and are then wound to obtain a bare cell; and the bare cell is placed in an outer package, injected with the above electrolyte solution and packaged to obtain a full battery.

Comparative Example 2

The conditions of comparative example 2 are the same as those of comparative example 1, except that in the preparation process of the positive electrode plate, 2 parts by weight of an active material of $LiFePO_4$ is replaced with 2 parts by weight of a lithium-supplementing agent of $Li_2Ni_{0.5}Cu_{0.5}O_2$ (L) with a specific surface area of 16.0 m$^2$/g, a volume-average particle size D50 of 5 μm and a pH of 12.0.

Comparative Example 3

The conditions of comparative example 3 are the same as those of comparative example 2, except that in the preparation process of the positive electrode plate, the binder A is replaced with an equal mass of the binder B.

Example 1

The conditions of example 1 are the same as those of comparative example 2, except that in the preparation process of the positive electrode plate, 80% by weight of the binder A (based on the total weight of the binder, the same below) is replaced with an equal mass of the binder C1.

Example 2

The conditions of example 2 are the same as those of comparative example 2, except that in the preparation process of the positive electrode plate, 50% by weight of the binder A is replaced with an equal mass of binder C1.

Example 3

The conditions of example 3 are the same as those of comparative example 2, except that in the preparation process of the positive electrode plate, 20% by weight of the binder A is replaced with an equal mass of binder C1.

Example 4

The conditions of example 5 are the same as those of example 3, except that in the preparation process of the positive electrode plate, the lithium-supplementing agent of $Li_2Ni_{0.5}Cu_{0.5}O_2$ used has a specific surface area of 6.2 m$^2$/g, a volume-average particle size D50 of 11 μm, and the binder A is replaced with an equal mass of the binder C1.

Example 5

The conditions of example 5 are the same as those of example 4, except that in the preparation process of the positive electrode plate, the lithium-supplementing agent of $Li_2Ni_{0.5}Cu_{0.5}O_2$ used has a specific surface area of 9.7 m$^2$/g and a volume-average particle size D50 of 8 μm.

Example 6-8

In examples 6-8, the conditions of examples 6-8 are the same as those of example 3, except that in the preparation process of the positive electrode plate, 0.05, 0.10 and 0.20 parts by weight of an active material of $LiFePO_4$ are replaced with equal parts by mass of a dispersant of phenol polyoxyethylene ether, and the binder A is completely replaced with an equal mass of the binder C1.

Example 9

The conditions of example 9 are the same as those of example 3, except that the positive electrode slurry is prepared according to the following method and the binder A is completely replaced with an equal mass of the binder C1.

In a dry mixing tank, 2 parts by weight of a binder C1 and 1 part by weight of a conductive agent of acetylene black are stirred and mixed at a rotation speed of 1000 rpm for 30 min; N-methylpyrrolidone (NMP) is added to a stirring tank, and the materials in the dry mixing tank is poured into the stirring tank, and stirred at a rotation speed of 1000 rpm for 30 min; 95 parts by weight of lithium iron phosphate and 2 parts by weight of a lithium-supplementing agent of $Li_2Ni_{0.5}Cu_{0.5}O_2$ are added and stirred at a rotation speed of 1200 rpm for 2 h to obtain the positive electrode slurry.

Example 10-13

In examples 10-13, the conditions of examples 10-13 are the same as those of example 3, except that in the preparation process of the positive electrode plate, 0.4, 0.8, 1.4 and 3.0 parts by weight of an active material of $LiFePO_4$ are replaced with equal parts by mass of lithium-supplementing agent of $Li_2Ni_{0.5}Cu_{0.5}O_2$, and the binder A is completely replaced with an equal mass of the binder C1.

Example 14-17

In examples 14-17, the conditions of examples 14-17 are the same as those of example 3, except that in the preparation process of the positive electrode plate, the lithium-supplementing agents of $Li_2Ni_{0.5}Cu_{0.5}O_2$ added in the positive electrode slurry has a pH of 11.0, 12.5, 13.0 and 12.0, respectively, and the binder A is completely replaced with an equal mass of the binder C1.

Example 18-22

In examples 18-22, the conditions of examples 18-22 are the same as those of example 17, except that in the preparation process of the positive electrode plate, the binder C1 is replaced with an equal mass of the binder C2, binder C3, binder C4, binder C5, and binder C6, respectively.

Example 23

In example 23, the conditions of example 23 are the same as those of example 17, except that in the preparation process of the positive electrode plate, the lithium-supplementing agent of $Li_2Ni_{0.5}Cu_{0.5}O_2$ is replaced with an equal mass of a lithium-supplementing agent of $Li_5FeO_4$ with a D50 of 7 μm and a pH of 13.5.

Measurement Method for Related Parameters 1. the Measurement of the pH of the Lithium-Supplementing Agent is Carried Out with Reference to the Standard GB/T9724-2007 "General Principles for the Determination of pH Value of Chemical Reagents"

5 g of a lithium-supplementing agent is added into 45 g of deionized water, stirred at a rotation speed of 200 rpm for 30 min, and then left to stand for 1.5 h to obtain the sample to be measured.

The measurement is carried out by a PHS-3 S LEI-CI acid meter. The pH electrode (an E-201-C-pH glass composite electrode) is rinsed with pure water at room temperature (25° C.), and the pH electrode glass ball is immersed in the solution to be measured, and stabilized for more than 30 s for a reading. An arithmetic average of the three measurements is taken as the final result.

2. Measurement of Weight-Average Molecular Weight of Binder

The weight-average molecular weight of the binder is determined by gel permeation chromatography (with reference to the standard: GB/T 21863-2008 gel permeation chromatography (GPC)—Tetrahydrofuran as eluent solvent).

A 0.3 wt % solution of a binder to be measured is prepared using N-methylpyrrolidone (NMP). A injection bottle is used to measure 0.5 ml of the solution of the binder to be measured, with the injection amount being set at 30-100 μL. The chromatographic column and pipeline are installed, the chromatograph (Waters e2695) is turned on, the mobile phase passes through a 0.45 μm disposable filter (to remove particles, insoluble gel, binder, etc.), and ultrasonic degassing is performed. After washing 2-4 times, the weight-average molecular weight of the binder can be obtained by measurement.

3. Measurement of the Fluorine Content by Nuclear Magnetic Resonance (Internal Standard Method)

A nuclear magnetic resonance fluorine content tester (PQ001, Newmark Technology) is used, and the test temperature thereof is adjusted to 32° C. after starting up, 0.3 g of a standard sample (with a known F content of hexafluorobenzene of $n_1$=10% (a mass percentage)) is put into the nuclear magnetic resonance fluorine content tester, and preheated for ten minutes, to start the measurement to obtain a signal intensity $x_1$ of the nuclear magnetic resonance fluorine spectrum. The same measurement method is used to measure the signal intensity of 0.4 g and 0.5 g of hexafluorobenzene and the standard curve of fluorine content is plotted. 1 g of the sample to be measured and 9 g is added and dissolved in N-methylpyrrolidone at a mass percentage of 10% to obtain a solution to be measured. 0.3 g of the solution to be measured is put into the nuclear magnetic resonance fluorine content tester, and repeated for three times to obtain the test signal intensities $y_1$, $y_2$ and $y_3$, and the F content of $n_2$ (i.e., m) is obtained by calculating the average thereof.

$$n_2 \text{ of sample to be measured} = n_1 * (y_1 + y_2 + y_3) / 3x_1$$

4. Measurement of Porosity

The porosity is measured by a true density method (with reference to GB/T24586-2009). An empty sample cup is put into a true density tester (AccuPyc II 1340), and the standard sample with a known porosity is measured to calibrate the instrument. Then the electrode plate is punched into 1.5394 $cm^2$ of discs, the number of which is more than 20, same is put into the sample cup, and then put into the instrument, the apparent density $\rho_A$ and the true density $\rho$ are measured according to the above standard, and the porosity of the sample is calculated according to the following formula:

$$\text{Porosity} = (\rho - \rho_A)/\rho * 100\%$$

5. Measurement of Liquid Absorption Rate

The liquid absorption rate is measured by the capillary method. Two 5 cm*5 cm of electrode plates are dried at 80° C. for 4 h, and then the thickness of the electrode plates is measured. The electrode plates are fixed on the sample table to keep the upper surfaces of the electrode plates in the horizontal direction. A capillary with an inner diameter of d=200 μm is used and polished with a 500 mesh sandpaper until the port is trimmed. The capillary is used to absorb the electrolyte solution, and the height of electrolyte solution in the capillary is controlled to be h=3 mm. The capillary is clamped on a bracket clamp with the opening direction of the capillary being perpendicular to the horizontal direction, the magnification of the microscope lens is adjusted until the picture is clear, the capillary is lowered to come into a contact with the electrode plate, and a stopwatch is used to record the time t required for the liquid level to start to drop to the end thereof. The liquid absorption rate is obtained by dividing the mass of the electrolyte solution in the capillary by the time described above: $V=\pi\times(d/2)^2\times h\times\rho/t$, wherein ρ is the density of the electrolyte solution.

The measurement is performed 3 times, and an average liquid absorption rate V is obtained by calculating the average.

6. Measurement of Specific Surface Area

The measurement method refers to the standard GB/T19587-2004 "Determination of Specific Surface Area of Solid Materials by Gas Adsorption BET Method".

8-15 g of a sample is loaded into a sample tube, and the initial mass of the sample is recorded. The weighed sample is loaded into an instrument of NOVA2000e. Then degassing is started, and the sample is heated to 200° C. and kept for 2 h. Thereafter, the mass of the degassed sample is recorded. Then the degassed sample is reloaded into the instrument and liquid nitrogen is poured for a BET test. The nitrogen pressure is set at 0.08-0.12 MPa, and the heating temperature is 40-350° C. After the measurement, the specific surface area is read from the test results.

6. Test of Specific Charge Capacity and Specific Discharge Capacity

The battery is charged at normal temperature (25° C.) at a constant current rate of 0.33 C to the end-of-charge voltage, and then charged at a constant voltage to 0.05 C; the charge capacity is measured to be Ec0, and the specific charge capacity can be obtained by dividing Ec0 by the mass of the positive electrode active material of the battery.

The above-mentioned charged battery is discharged at a constant current rate of 0.33 C to an end-of-discharge voltage, and the discharge capacity is measured to be Ed0. The specific discharge capacity can be obtained by dividing Ed0 by the mass of the positive electrode active material of the battery.

The tests of specific charge capacity and specific discharge capacity are repeated 5 times respectively, and the averages are taken as the specific charge capacity and specific discharge capacity described in table 3.

Specific charge capacity (mAh/g)=charge capacity of the first cycle/mass of the positive electrode active material Specific discharge capacity (mAh/g)=discharge capacity of the first cycle/mass of the positive electrode active material 7. Gelling and Interface Test of Gelling:

a fresh slurry in a beaker is sealed with a plastic wrap, (1). the slurry being left to stand is taken out, and a picture of the front logo and the sealing of the beaker is taken with a mobile phone;

(2). the plastic wrap is opened, and the surface of the slurry is gently stirred with a steel rule to check whether there is any abnormity on the surface of the slurry and whether the color has changed;

(3). the steel rule is slowly dipped into the slurry and gently moved up and down to preliminarily judge the viscosity of the slurry; the viscosity of the slurry is measured by a viscosity tester according to the viscosity test standard DB13/T 5026.1-2019, and the data is recorded; and (4). a part of the slurry is scooped out with the steel rule, the fluidity of the slurry is checked and a picture is taken to record.

Figure 3A:
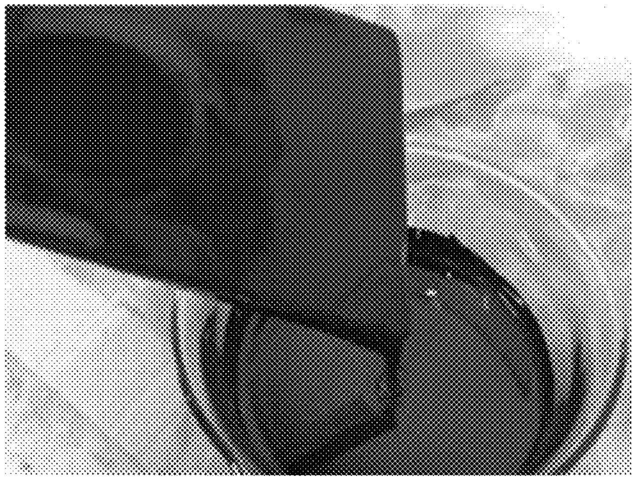
FIGS. 3A-3C show pictures of the gelling states of the positive electrode slurry of the present application for mild gelling (FIG. 3A), moderate gelling (FIG. 3B), and severe gelling (FIG. 3C).
Figure 3B:
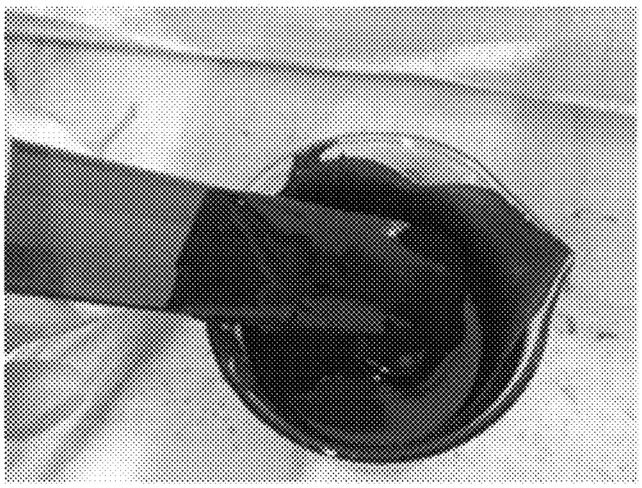
Figure 3C:
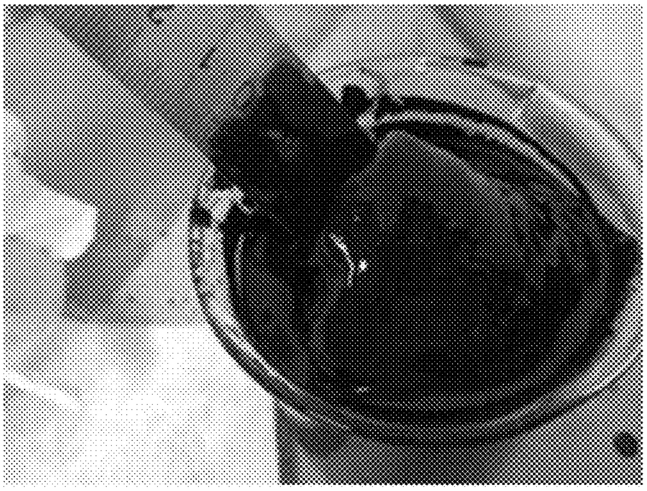
Figure 4:
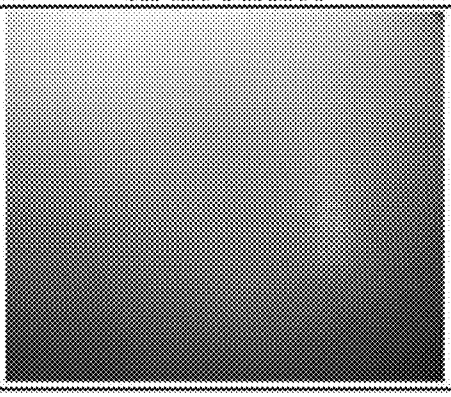
FIG. 4 is a picture of the surface morphology of a positive electrode plate according to an embodiment of the present application under an electron microscope CCD (Quantum QLS scope) (50-100 times magnification).
Figure 4:
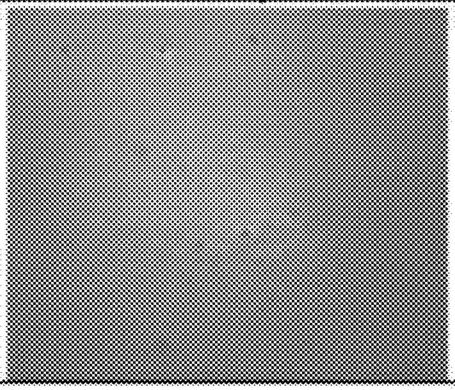

The gelling of the slurry after having been left to stand for 24 h is observed, and the gelling is divided into the following grades:

a. mild gelling (FIG. 3A): the slurry has good fluidity, but there is obvious reflection on the liquid surface, and the downline of the slurry is protruding from the liquid surface.

b. moderate gelling (FIG. 3B): the slurry has poor fluidity and is flocculent; the slurry is flocculent-like, but has no solid properties; no jelly lumps.

c. severe gelling (FIG. 3C): the slurry has no fluidity and is jellylike; the slurry is of a solid property, has no fluidity, and can be picked up as a whole.

Test of Interface:

The coated electrode plate is placed under an electron microscope CCD (Quantum QLS scope), at a magnification of 50-100 times, and the surface morphology is observed.

8. Test of 50% SOC 4 C 10 s (10th Second) Direct Current Resistance (mΩ)

The secondary battery to be tested is charged to a voltage of 3.65 V at a rate of 1 C at room temperature, and then discharged to a voltage of 2.5 V at a rate of 1 C, the reversible capacity E0 can be measured by reading directly from the instrument.

The secondary battery to be tested is charged to a voltage of 3.65 Vat a rate of 0.33 C at room temperature, and then discharged at a rate of 0.33 C for 90 min, the state of the battery cell is adjusted to 50% SOC (i.e., 50% capacity), and the voltage at this moment is recorded as $U_{initial}$; then same is further discharge at a rate of 4 C for 30 s, and the voltage at 10 s of the discharge is recored as $U_{end}$. The corresponding resistance at the 10th second is calculated according to the following formula:

$$DCR=(U_{initial}-U_{end})/I$$

9. Test of 100D Storage Retention Rate at 60° C.

The secondary battery to be tested is charged to a voltage of 3.65 V at a rate of 1 C at room temperature, and then discharged to a voltage of 2.5 V at a rate of 1 C, the reversible capacity E0 can be measured by reading directly from the instrument. The fully charged secondary battery is then placed in an oven at 60° C., the battery is taken out every 20 days, and the reversible capacity thereof is measured immediately and recorded as En.

The capacity retention rate of the battery before and after storage at 60° C. is calculated according to the following formula: $\varepsilon=(En-E0)/E0\times100\%$.

The capacity retention rates in table 3 is measured by the above method after 100 days of storage.

10. Infrared Spectrum Test of F Content of Electrode Plate

The positive electrode plate is soaked in 4 mol/L of sulfuric acid at 80° C. for 2 h, and then the solid residue is taken from filtration. The solid residue is tested by infrared spectroscopy according to the following methods (with reference to the standard GB/T21186-2007): 1 g of a sample powder, a separator of 4*4 $cm^2$ is taken. 1-2 mg of the sample is put into an agate mortar, 150 mg of a potassium bromide sample is added, and ground for 15 min. The sample after grinding is placed in a mold and tableted in a tablet press. In the infrared test instrument (a light source of a mid-infrared Ever-Clo light source, a beam splitter of KBr/Ge, a Maxson interferometer, and a detector of DTGS), the background is scanned first, then the tableted sample is scanned, with the wavenumber range being between 400-4000 $cm^{-1}$. In the infrared spectrum, the peak areas corresponding to the —$CF_2$ stretching vibration peaks of 1209 $cm^{-1}$ and 1184 $cm^{-1}$, the —CF stretching vibration peak of 1070 $cm^{-1}$ and the anti-symmetric stretching vibration peak of —$CF_2$ of 840 $cm^{-1}$ are a1, a2, a3 and a4, respectively.

Three PVDF standard samples with the same mass and different F contents (known F contents) are subjected to infrared spectrum test according to the above method, and the peak areas a corresponding to the positions of 1209 $cm^{-1}$, 1184 $cm^{-1}$, 1070 $cm^{-1}$ and 840 $cm^{-1}$ are taken, with standard curves (functional group content m=ka+b) being plotted.

The infrared peak heights of a1, a2, a3 and a4 of the sample to be tested are substituted into the standard curve, and the contents of different monomers are calculated according to the formula m=ka+b.

TABLE 1

List of experimental conditions during the preparation of binders A, B and C1-C6

| Binder No. | Type of materials | Substitution amount of F | Weight-average molecular weight/ten thousand | Amount of ethyl acetate added/kg | Reaction time/h | Temperature/° C. | Pressure/MPa | VDF/kg | TFE/kg |
|---|---|---|---|---|---|---|---|---|---|
| A | PVDF resin | 0.49 | 70 | 0.9 | 5 | 70 | 6 | 10 | 0 |
| B | PVDF resin | 0.47 | 110 | 0.5 | 16 | 70 | 8 | 9.5 | |
| C1 | PVDF resin | 0.62 | 70 | 1.05 | 5 | 70 | 6 | 7.5 | 2.5 |
| C2 | PVDF resin | 0.62 | 50 | 1.2 | 3 | 70 | 4.2 | 7.5 | 2.5 |
| C3 | PVDF resin | 0.62 | 90 | 0.7 | 12 | 70 | 8 | 7.5 | 2.5 |
| C4 | PVDF resin | 0.62 | 120 | 0.5 | 20 | 70 | 8 | 7.5 | 2.5 |
| C5 | PVDF resin | 0.57 | 70 | 1.05 | 5 | 70 | 6 | 8.6 | 1.4 |
| C6 | PVDF resin | 0.67 | 70 | 1.05 | 5 | 70 | 6 | 6.7 | 3.3 |

Note
[1]: 0.5 kg of acrylic acid is used in the preparation of the binder B.

TABLE 2

List of experimental conditions of examples 1-23 and comparative examples 1-3

| | Positive electrode plate | | | | | | | | | |
|---|---|---|---|---|---|---|---|---|---|---|
| Example No. | Active materials | Ratio of lithium-supplementing agent to binder of formula (II) | pH of lithium-supplementing agent L | Content of lithium-supplementing agent | lithium-supplementing agent BET ($m^2/g$) | lithium-supplementing agent D50 (μm) | Content of dispersant | Content of binder A | Content of binder B | Content of binder C |
| Example 1 | LFP | 1.0 | 12.0 | 2.00% | 16.0 | 5 | / | 20% | / | C1, 80% |
| Example 2 | LFP | 1.0 | 12.0 | 2.00% | 16.0 | 5 | / | 50% | / | C1, 50% |
| Example 3 | LFP | 1.0 | 12.0 | 2.00% | 16.0 | 5 | / | 80% | | C1, 20% |
| Example 4 | LFP | 1.0 | 12.0 | 2.00% | 6.2 | 11 | / | / | / | C1, 100% |
| Example 5 | LFP | 1.0 | 12.0 | 2.00% | 9.7 | 8 | / | / | / | C1, 100% |
| Example 6 | LFP | 1.0 | 12.0 | 2.00% | 16.0 | 5 | 0.05% | / | / | C1, 100% |
| Example 7 | LFP | 1.0 | 12.0 | 2.00% | 16.0 | 5 | 0.10% | / | / | C1, 100% |
| Example 8 | LFP | 1.0 | 12.0 | 2.00% | 16.0 | 5 | 0.20% | / | / | C1, 100% |
| Example 9 | LFP + premi × process | 1.0 | 12.0 | 2.00% | 16.0 | 5 | / | / | / | C1, 100% |
| Example 10 | LFP | 0.2 | 12.0 | 2.00% | 16.0 | 5 | / | / | / | C1, 100% |
| Example 11 | LFP | 0.4 | 12.0 | 2.00% | 16.0 | 5 | / | / | / | C1, 100% |

TABLE 2-continued

List of experimental conditions of examples 1-23 and comparative examples 1-3

| Example No. | Positive electrode plate: Active materials | Ratio of lithium-supplementing agent to binder of formula (II) | pH of lithium-supplementing agent L | Content of lithium-supplementing agent | lithium-supplementing agent BET ($m^2/g$) | lithium-supplementing agent D50 (μm) | Content of dispersant | Content of binder A | Content of binder B | Content of binder C |
|---|---|---|---|---|---|---|---|---|---|---|
| Example 12 | LFP | 0.7 | 12.0 | 2.00% | 16.0 | 5 | / | / | / | C1, 100% |
| Example 13 | LFP | 1.5 | 12.0 | 2.00% | 16.0 | 5 | / | / | / | C1, 100% |
| Example 14 | LFP | 1.0 | 11.0 | 2.00% | 16.0 | 5 | / | / | / | C1, 100% |
| Example 15 | LFP | 1.0 | 12.5 | 2.00% | 16.0 | 5 | / | / | / | C1, 100% |
| Example 16 | LFP | 1.0 | 13.0 | 2.00% | 16.0 | 5 | / | / | / | C1, 100% |
| Example 17 | LFP | 1.0 | 12.0 | 2.00% | 16.0 | 5 | / | / | / | C1, 100% |
| Example 18 | LFP | 1.0 | 12.0 | 2.00% | 16.0 | 5 | / | / | / | C2, 100% |
| Example 19 | LFP | 1.0 | 12.0 | 2.00% | 16.0 | 5 | / | / | / | C3, 100% |
| Example 20 | LFP | 1.0 | 12.0 | 2.00% | 16.0 | 5 | / | / | / | C4, 100% |
| Example 21 | LFP | 1.0 | 12.0 | 2.00% | 16.0 | 5 | / | / | / | C5, 100% |
| Example 22 | LFP | 1.0 | 12.0 | 2.00% | 16.0 | 5 | / | / | / | C6, 100% |
| Example 23 | LFP | 1.0 | 12.0 | 2.00% | 13.5 | 7 | / | / | / | C1, 100% |
| Comparative example 1 | LFP | 0.0 | / | / | / | / | / | 100% | / | / |
| Comparative example 2 | LFP | 1.0 | 12.0 | 2.00% | 16.0 | 5 | / | 100% | / | / |
| Comparative example 3 | LFP | 1.0 | 12.0 | 2.00% | 16.0 | 5 | / | / | 100% | / |

Note
In example 23, the lithium-supplementing agent of $Li_2Ni_{0.5}Cu_{0.5}O_2$ is replaced with an equal mass of $Li_5FeO_4$.

TABLE 3

List of test results of examples 1-23 and comparative examples 1-3

| Example No. | Specific charge capacity (mAh/g) | Specific discharge capacity (mAh/g) | Gel condition | Interface condition | Porosity (%) | Positive liquid absorption rate (μg/s) | 50% SOC 4C 10 s direct current resistance (mΩ) | 100D storage retention rate at 60° C. (%) |
|---|---|---|---|---|---|---|---|---|
| Example 1 | 163.4 | 144.1 | Mild gelling | A small number of holes and pits, and agglomeration of trace particles | 29.9% | 5.86 | 21.99 | 95.50% |
| Example 2 | 161.6 | 142.8 | Moderate gelling | Agglomeration of part of particles | 29.5% | 4.82 | 22.42 | 93.90% |
| Example 3 | 159.2 | 141.9 | Moderate gelling | Agglomeration of a large number of particles | 29.0% | 4.61 | 22.57 | 93.20% |
| Example 4 | 159.0 | 141.6 | Moderate gelling | Agglomeration of part of particles | 29.5% | 4.66 | 22.96 | 93.10% |

TABLE 3-continued

List of test results of examples 1-23 and comparative examples 1-3

| Example No. | Specific charge capacity (mAh/g) | Specific discharge capacity (mAh/g) | Gel condition | Interface condition | Porosity (%) | Positive liquid absorption rate (μg/s) | 50% SOC 4C 10 s direct current resistance (mΩ) | 100D storage retention rate at 60° C. (%) |
|---|---|---|---|---|---|---|---|---|
| Example 5 | 160.0 | 141.7 | Mild gelling | Agglomeration of trace particles | 30.1% | 4.7 | 22.69 | 94.60% |
| Example 6 | 166.0 | 145.4 | No gelling | Part of holes and pits, and agglomeration of trace particles | 31.9% | 7.1 | 21.62 | 96.70% |
| Example 7 | 166.5 | 146.3 | No gelling | Part of holes and pits, good dispersion, and almost no agglomeration | 31.6% | 7.02 | 21.78 | 97.60% |
| Example 8 | 166.3 | 145.8 | No gelling | Part of holes and pits, good dispersion, and almost no agglomeration | 30.3% | 6.93 | 21.95 | 96.80% |
| Example 9 | 165.6 | 145.9 | No gelling | Trace holes and pits, good dispersion, and almost no agglomeration | 29.6% | 5.96 | 21.98 | 95.90% |
| Example 10 | 159.8 | 140.7 | Moderate gelling | More holes and pits, and agglomeration of part of particles | 33.8% | 7.55 | 24.56 | 94.70% |
| Example 11 | 160.6 | 141.8 | Mild gelling | Part of holes and pits, and agglomeration of part of particles | 32.3% | 7.22 | 22.88 | 93.70% |
| Example 12 | 162.6 | 142.5 | Mild gelling | Part of holes and pits, and agglomeration of trace particles | 31.3% | 7.02 | 22.43 | 95.00% |
| Example 13 | 165.1 | 144.2 | No gelling | Part of holes and pits, and agglomeration of trace particles | 30.3% | 6.95 | 21.74 | 95.30% |
| Example 14 | 165.9 | 146.2 | No gelling | Part of holes and pits, and agglomeration of trace particles | 31.3% | 7.03 | 21.55 | 95.80% |
| Example 15 | 165.1 | 144.2 | Moderate gelling | Part of holes and pits, and agglomeration of part of particles | 29.8% | 6.88 | 21.96 | 94.90% |
| Example 16 | 160.5 | 141.4 | Moderate gelling | Part of holes and pits, and agglomeration of part of particles | 29.2% | 6.78 | 22.42 | 94.10% |
| Example 17 | 165.3 | 145.0 | No gelling | Part of holes and pits, and agglomeration of trace particles | 31.7% | 7.15 | 21.65 | 96.40% |
| Example 18 | 163.5 | 144.1 | No gelling | Part of holes and pits, and agglomeration of trace particles | 31.2% | 7.04 | 21.74 | 95.60% |
| Example 19 | 164.2 | 144.5 | Mild gelling | Part of holes and pits, and part agglomeration | 32.2% | 7.28 | 22.56 | 94.90% |

TABLE 3-continued

List of test results of examples 1-23 and comparative examples 1-3

| Example No. | Specific charge capacity (mAh/g) | Specific discharge capacity (mAh/g) | Gel condition | Interface condition | Porosity (%) | Positive liquid absorption rate (μg/s) | 50% SOC 4C 10 s direct current resistance (mΩ) | 100D storage retention rate at 60° C. (%) |
|---|---|---|---|---|---|---|---|---|
| Example 20 | 163.3 | 143.8 | Moderate gelling | Part of holes and pits, and part agglomeration | 32.8% | 7.35 | 23.48 | 93.80% |
| Example 21 | 164.5 | 144.3 | Mild gelling | Part of holes and pits, and part agglomeration | 32.3% | 7.26 | 22.47 | 95.30% |
| Example 22 | 164.7 | 144.6 | No gelling | Part of holes and pits, and agglomeration of trace particles | 31.8% | 7.18 | 21.68 | 95.90% |
| Example 23 | 166.7 | 143.6 | No gelling | Part of holes and pits, and agglomeration of trace particles | 30.5% | 6.78 | 21.88 | 95.7% |
| Comparative example 1 | 156.7 | 140.8 | No gelling | Smooth interface | 27.9% | 4.50 | 20.87 | 92% |
| Comparative example 2 | / | / | Severe gelling | Agglomeration of a large number of particles | / | / | / | / |
| Comparative example 3 | / | / | Severe gelling | Coating being impossible | / | / | / | / |

As can be seen from table 3, the gelling and various properties of examples 1-23 are significantly improved compared to comparative examples 1-3. When the substitution amount of fluorine in the binder represented by formula (II) is in the range of 0.5-0.7, the gelling problem of the positive electrode slurry can be significantly improved, and the dynamics performance and storage retention rate of the battery can be improved. By further adjusting the parameters, such as molecular weight and amount of the binder represented by formula (II) and the weight ratio thereof to the lithium-supplementing agent, as well as the pH of the lithium-supplementing agent, the amount of the dispersant, the gelling can be further improved and the storage retention rate of the battery can be improved.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A positive electrode slurry composition, wherein the composition comprises a positive electrode active material, a lithium-supplementing agent and a binder, the positive electrode active material includes a lithium-containing phosphate represented by formula (I), $LiFe_{1-b1-c1}Mn_{b1}M^1_{c1}PO_4$ formula (I)

in which $0 \leq b1 \leq 1$, $0 \leq c1 < 0.1$, and $M^1$ is selected from at least one of a transition metal element other than Fe or Mn and a non-transition metal element;

the lithium-supplementing agent is selected from one or more of lithium metal oxides of $Li_{a1}M^2O_{0.5(2+a1)}$, $Li_2M^3O_3$, $Li_2M^4O_4$, $Li_3M^5O_4$, $Li_5M^6O_4$, and $Li_5M^7O_6$, in which $a1 \geq 1$, $M^2$ is selected from one or more of Ni, Co, Fe, Mn, Zn, Mg, Ca, Cu and Sn, $M^3$ is selected from one or more of Ni, Co, Fe, Mn, Sn and Cr, $M^4$ is selected from one or more of Ni, Co, Fe, Mn, Sn, Cr, V and Nb, $M^5$ is selected from one or more of Ni, Co, Fe, Mn, Sn, Cr, V, Mo and Nb, $M^6$ is selected from one or more of Ni, Co, Fe, Mn, Sn, Cr and Mo, $M^7$ is selected from one or more of Ni, Co and Mn, and the valence state of each element of $M^2$, $M^3$, $M^4$, $M^5$, $M^6$ and $M^7$ is lower than its own highest oxidation valence state, respectively; and the binder is represented by formula (II):

formula (II)

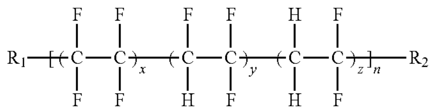

in which $R_1$ and $R_2$ are independently H or F, x, y, z, and n are all positive integers, and $0.52 \leq (4x+3y+2z)/(4x+4y+4z) \leq 0.7$, and the binder has a weight-average molecular weight of 500,000 to 1,200,000.

2. The composition according to claim 1, wherein the lithium-supplementing agent comprises at least a lithium metal oxide represented by formula (III), $$Li_{a2}Ni_{b2}Cu_{1-b2-c2}M^8_{c2}O_2 \quad \text{formula (III)}$$

in which $1<a2<3$, $0<b2<1$, $0 \leq c2<0.1$, and $M^8$ is selected from one or more of Zn, Sn, Mg, Fe and Mn.

3. The composition according to claim 1, wherein the mass percentage of the binder of formula (II) in the composition is 0.2 wt %-10 wt %.

4. The composition according to claim 1, wherein the mass ratio of the binder of formula (II) to the lithium-supplementing agent in the composition is 0.2-2.

5. The composition according to claim 1, wherein the mass percentage of the lithium-supplementing agent in the composition is 0.1 wt %-10 wt %.

6. The positive electrode plate claim 1, wherein the lithium-supplementing agent has a volume average particle size D50 of 5 μm-15 μm, and the positive electrode active material has a volume average particle size D50 of 0.5 μm-5 μm.

7. The composition according to claim 1, wherein the lithium-supplementing agent has a pH of ≤13.

8. The composition according to claim 1, wherein the outer side of the lithium-supplementing agent is coated with a single-layer or multi-layer coating layer, and the coating layer comprises one or more of the following materials: a metal fluoride, an oxide, a metal phosphate, a lithium salt, elemental carbon, and a polymer containing a five-membered heterocycle.

9. The composition according to claim 8, wherein the coating layer comprises one or more of the following materials: $AlF_3$, $V_2O_5$, $Al_2O_3$, $ZrO_2$, $TiO_2$, ZnO, $Co_3O_4$, $SiO_2$, $AlPO_4$, $FePO_4$, $Co_3(PO_4)_2$, $Ni_3(PO_4)_2$, $Li_3PO_4$, $Li_2MnO_3$, $LiAlO_2$, $Li_2TiO_3$, $Li_2ZrO_3$, graphene, carbon nanotubes, poly 3,4-ethylenedioxythiophene, and polypyrrole.

10. The composition according to claim 1, wherein the lithium-supplementing agent has a specific surface area of 0.5 $m^2/g$-20 $m^2/g$.

11. The composition according to claim 1, wherein in addition to the binder represented by formula (II), the composition further comprises one or more of the following materials as a binder: carboxymethyl cellulose, hydroxypropyl cellulose, polyacrylic acid, polyvinylidene fluoride, polytetrafluoroethylene, polyvinyl alcohol, starch, polyvinylpyrrolidone, polyethylene, polypropylene, an ethylene-propylene-propadiene terpolymer or a sulfonated ethylene-propylene-propadiene terpolymer, an ethylene-propylene-butadiene terpolymer or a sulfonated ethylene-propylene-butadiene terpolymer, an ethylene-propylene-pentadiene terpolymer or a sulfonated ethylene-propylene-pentadiene terpolymer, an ethylene-propylene-hexadiene terpolymer or a sulfonated ethylene-propylene-hexadiene terpolymer, a styrene butadiene rubber, and a fluorine-containing rubber; and/or the composition further comprises one or more of the following materials as a dispersant: sodium polyacrylate, sodium dodecylbenzenesulfonate, polypentene nitrile, polyacrylonitrile, and phenol polyoxyethylene ether.

12. The composition according to claim 11, wherein the dispersant is phenol polyoxyethylene ether.

13. The composition according to claim 1, wherein the positive electrode active material comprises lithium iron phosphate, and one or more of lithium ferrous phosphate, lithium manganese phosphate, lithium titanium phosphate, lithium cobalt phosphate, and lithium vanadium phosphate.

14. A positive electrode plate, comprising a composition according to claim 1.

15. The positive electrode plate according to claim 14, wherein, the mass percentage of the composition according to claim 1 in a film layer of the positive electrode plate is not less than 80%.

16. A secondary battery, comprising a positive electrode plate of claim 15.

17. A battery module, comprising a secondary battery of claim 6.

18. A battery pack, comprising the battery module of claim 17.

19. A power consuming device, comprising the battery pack of claim 18, as a power supply of the power consuming device or an energy storage unit of the power consuming device.

* * * * *